(No Model.)
W. J. COE.
ELASTIC TIRE.
No. 495,218.  Patented Apr. 11, 1893.
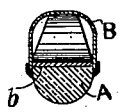
FIG. 5.
FIG. 6.
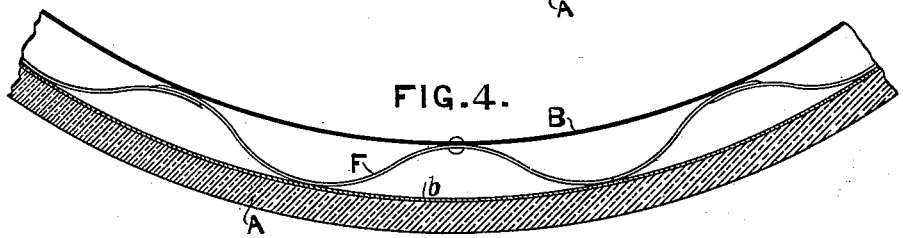
FIG. 4.
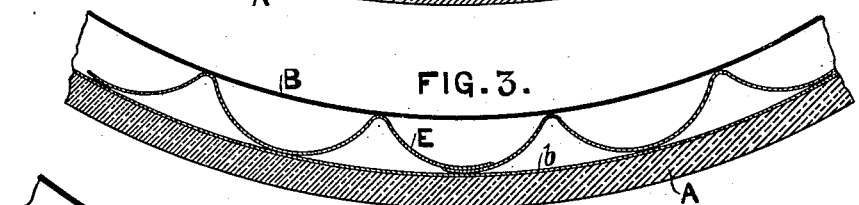
FIG. 3.
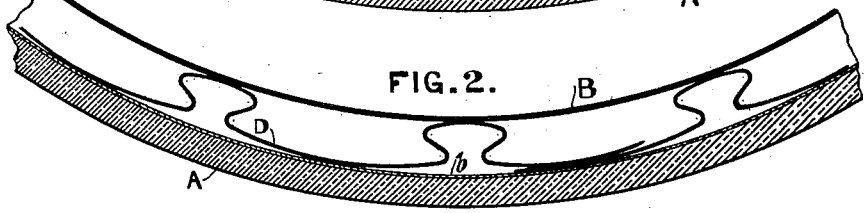
FIG. 2.
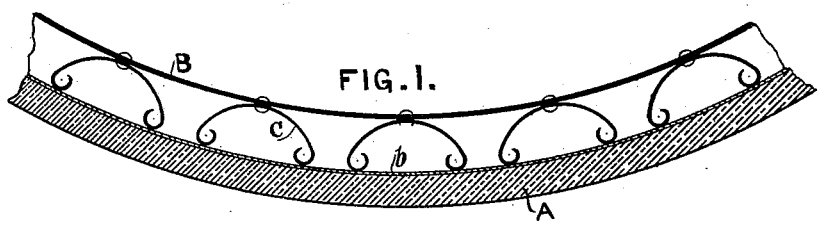
FIG. 1.
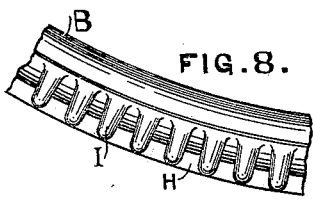
FIG. 8.
FIG. 10.
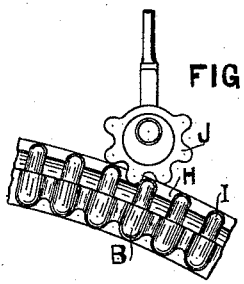
FIG. 11.
FIG. 9.
FIG. 7.
Witnesses
H. A. Carhart.
C. B. Kinne
Inventor
William John Coe
By Smith & Denison
his Attorneys

UNITED STATES PATENT OFFICE.

WILLIAM J. COE, OF LIVERPOOL, ENGLAND.

ELASTIC TIRE.

SPECIFICATION forming part of Letters Patent No. 495,218, dated April 11, 1893.

Application filed November 16, 1891. Serial No. 412,010. (No model.) Patented in England November 14, 1890, No. 18,359.

*To all whom it may concern:*

Be it known that I, WILLIAM JOHN COE, consulting engineer, a subject of the Queen of Great Britain, residing at Liverpool, in the county of Lancaster, in the Kingdom of England, have invented certain new and useful Improvements in Elastic Tires, (for which I have obtained Letters Patent in England, No. 18,359, dated November 14, 1890,) of which the following is a specification.

This invention has for its object an elastic tire which, while having all the advantages of the pneumatic tire and being, to a certain extent, a pneumatic tire, will avoid the defect so objected to in the latter, that it is liable to get cut and become useless.

By my invention, I employ a comparatively thick tread of india rubber supported and made elastic by springs or their equivalent.

In the accompanying drawings:—Figures 1, 2, 3 and 4 show, in sectional elevation, examples of portions of my improved tire; Figs. 5 and 6 transverse sections thereof. Figs. 7 and 8 are elevations of portions of my improved pneumatic or cushion tire, and Figs. 9 and 10 transverse sections thereof. Fig. 11 is a view of the brake I propose to apply to the corrugated or serrated tire.

Referring to Figs. 1 to 6 inclusive of the drawings:—A, is the india rubber tire which may, if desired, have a flat, channeled or indented surface, B the metal rim or felly of the wheel, and *b* an annular or bent plate placed in the trough of the felly. This latter can be used or not as desired. Between the rim B (which may be of any suitable section, such as that which is shown in Figs. 5 and 6) and the inner surface of the rubber tire or the annular plate *b* when used, I fix a series of springs such as C D E F. These springs can be in the form of carriage springs, volute springs, simple blades or other arrangement of springs as desired. In Fig. 1, the springs are riveted to the rim of the wheel, the extremities of each spring bearing loosely against the annular plate *b*. In Fig. 2, the springs are made in lengths, the ends of each length overlapping the ends of the adjacent lengths. The portions of the spring which rest on the bottom of the rim can either be fastened thereto by rivets, or the ends of the spokes may be passed through the spring and riveted over. In Fig. 3, the arrangement of the springs is somewhat similar, but the shape thereof is different being less elastic than those shown in Fig. 2. In Fig. 4 an undulating form of spring is shown, each length being riveted to the rim, while the ends overlap the ends of the adjacent lengths, whereby sufficient play is provided when the wheel is compressed. Cross sections of the rim and springs are shown in Figs. 5 and 6.

Instead of springs, a tube of air may be used. This may be used in conjunction with the tire A or be formed as part of the rubber tire (Figs. 7 and 8) but in order to lessen the chance of puncture, the tread is made very much thicker than the other part and is channeled and provided with a longitudinal web H and transverse webs I. The result is that the wheels run on these webs and not on the tire itself, and thus it requires a very deep puncture indeed to cut into the tube. If the whole tire be webbed instead of only the tread thereof, the rim is provided with channels similar to the webs (see Fig. 7). Furthermore, where these webs H and I are used, a brake can be formed of a wheel having elevations or ribs on it, complementary to the depressions or grooves in the tire. By pressing this wheel J tight on the tire therefore braking is effected without the scrubbing action, the latter being very destructive to the tire.

In the above description it will be obvious that the springs can be arranged in a vast variety of ways, two or more series of springs can be used, to break joint with each other and thus the bearing be extended over a large surface, a blow on the tire being by these springs brought to two or more spokes instead of only to the nearest spoke. Furthermore, instead of the bearing of the tire upon the rim coming about an inch and a half or two inches from the tread as in ordinary pneumatic tires, the bearing *b* in my apparatus can come within about five-eighths or three-fourths of an inch off the tread namely the thickness of the tire and webs attached to it. If a spring breaks at any time, it not being in the tire, but between the tire and the rim of the wheel, it can be very easily taken out and another inserted and the tire allowed to shrink back into position.

These tires are applicable not merely to velocipedes, but with suitable modifications to road vehicles. In some cases, the india rubber tire will be sheathed with or replaced by jointed or flexible steel or other hard metal tires.

I declare that what I claim is—

1. A vehicle tire comprising the rim, the elastic tire secured thereon, the bearing plate within the elastic tire, and a series of disconnected springs interposed between the rim and tire, each spring being arched centrally creating the bearing against the rim, and having its extremities curved inwardly creating rounded bearings upon the spring arms, against said rim, in combination as set forth.

2. A vehicle tire comprising the rim, the elastic tire secured thereon, and a series of disconnected springs interposed between the rim and tire, each spring being arched creating a rounded bearing against the tire, and having its extremities reversely curved creating rounded bearings, upon the spring arms against the rim, in combination as set forth.

In testimony whereof I have signed my name to this specification in the presence of two subscribing witnesses.

WILLIAM J. COE.

Witnesses:
GEO. C. DYMOND,
WM. P. THOMPSON.